United States Patent
Yamanaka et al.

(10) Patent No.: US 6,792,762 B1
(45) Date of Patent: Sep. 21, 2004

(54) GAS TURBINE EQUIPMENT AND GAS TURBINE COOLING METHOD

(75) Inventors: Kazunori Yamanaka, Hitachi (JP); Masami Noda, Hitachinaka (JP); Shinya Marushima, Hitachinaka (JP); Satoshi Kondo, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/623,273

(22) PCT Filed: Nov. 10, 1999

(86) PCT No.: PCT/JP99/06256
§ 371 (c)(1),
(2), (4) Date: Oct. 1, 2001

(87) PCT Pub. No.: WO01/34956
PCT Pub. Date: May 17, 2001

(51) Int. Cl.$^7$ ................................................. F02C 7/18
(52) U.S. Cl. .............................. 60/782; 60/785; 60/806; 415/115
(58) Field of Search .......................... 60/782, 785, 806; 415/115

(56) References Cited

U.S. PATENT DOCUMENTS

| | | | | |
|---|---|---|---|---|
| 2,786,341 A | * | 3/1957 | Green | 62/5 |
| 5,185,997 A | * | 2/1993 | Nishijima | 60/806 |
| 5,351,478 A | * | 10/1994 | Walker et al. | 60/785 |
| 6,253,554 B1 | * | 7/2001 | Kobayashi et al. | 60/736 |
| 6,393,826 B1 | * | 5/2002 | Yamanaka et al. | 60/785 |

FOREIGN PATENT DOCUMENTS

| | | |
|---|---|---|
| JP | 62-111133 | 5/1987 |
| JP | 62-170732 | 7/1987 |
| JP | 2-248630 | 10/1990 |
| JP | 2-267326 | 11/1990 |
| JP | 2-267327 | 11/1990 |
| JP | 5-179993 | 7/1993 |
| JP | 7-189740 | 7/1995 |

OTHER PUBLICATIONS

Microfilm of the specification and drawings annexed to the request of Japanese Utility Model Application No. 59424/1964 (Laid–open No. 171935/1985) (Nippon Steel Corporation), Nov. 14, 1985 (Family: none).

* cited by examiner

Primary Examiner—Ted Kim
(74) Attorney, Agent, or Firm—McDermott Will & Emery LLP

(57) ABSTRACT

It is the object of the present invention to feed cooling air suitable for cooling the high-temperature part of the gas turbine.

The present invention comprises a compressor, a combustor, and a turbine. Further, a turbine-cooling system to feed the gas from the compressor to the turbine is provided, and the turbine-cooling system comprises a heat exchanger to cool the gas compressed by the compressor, and a means for separating liquid from the gas cooled by the heat exchanger.

Thus, according to the present invention, it becomes possible to feed cooling air suitable for cooling the high-temperature part of the gas turbine and to achieve higher reliability of the gas turbine unit.

6 Claims, 3 Drawing Sheets

GAS TURBINE EQUIPMENT AND GAS TURBINE COOLING METHOD

TECHNICAL FIELD

The present invention relates to a gas turbine unit and a gas-turbine cooling method.

BACKGROUND ART

It is required to increase the capacity and the efficiency of gas-turbine power-generating equipment to meet the ever-increasing demand of electric power and address the problem of the warming up of the earth. In the case of gas-turbine power-generating equipment, in particular, wherein air compressed by a compressor is fed to a combustor, fuel is fed to the combustor to be burned, and the combustion gas drives a gas turbine, its capacity and efficiency can be increased by raising the combustion temperature.

However, the gas turbine exposed to and driven by combustion gas of high temperature may be damaged, if not cooled, and such damage may lead to a serious accident of the gas-turbine power-generating equipment. Therefore, in the gas-turbine power-generating equipment using the high-temperature combustion gas, the high-temperature part of the gas turbine is cooled with compressed air or steam.

Besides, the efficiency of gas-turbine power-generating equipment can be increased by collecting heat from the refrigerant after it cools the high-temperature part of the gas turbine. On the other hand, it is desirable to reduce the flow rate of the refrigerant as low as permissible.

The configuration of the cooling holes to cool the high-temperature part of the gas turbine is complex for higher cooling efficiency. Accordingly, if dust, etc. disturb the smooth flow of refrigerant or cooling holes are clogged with dust, etc., the cooling efficiency decreases and the gas turbine may be damaged. Therefore, the gas turbine requires highly purified refrigerant. Besides, refrigerant for cooling the high-temperature part of the gas turbine is required to be highly purified so that the refrigerant can flow smoothly through the complex cooling holes, its flow rate can be reduced as low as permissible, and the efficiency of the gas-turbine power-generating equipment can be increased.

For example, Japanese Unexamined Patent Application No. 54-82518 disclosed a configuration of air-cooled gas turbine wherein air discharged from a compressor is cooled by a heat exchanger, the pressure of the air is raised by a booster compressor, and the air is fed to the high-temperature part of the gas turbine to cool the part and collected to a combustor.

Japanese Unexamined Patent Applications Nos. 2-264127, 2-267326, 7-189740, and 7-317562 disclosed technique for cooling the high-temperature part of the gas turbine.

In the case of the above air-cooled gas turbine, such problems are not addressed as the generation of mist due to the cooling of air by the heat exchanger, the damage of the booster compressor due to alien substances in cooling air, the decrease of the cooling efficiency and the damage to the turbine due to the clogging of cooling holes with alien substances in cooling air, and so on.

For example, if cooling air contains alien substances such as dust, the cooling holes, of which the configuration is complex for high cooling efficiency, may get clogged with such alien substances, reducing the flow rate of the refrigerant, and the gas turbine may be damaged.

The object of the present invention is to provide a gas turbine unit and a gas-turbine cooling method capable of feeding cooling air suitable for cooling the high-temperature part of the gas turbine.

DISCLOSURE OF THE INVENTION

The gas turbine unit of the present invention comprises a compressor to compress and discharge gas, a combustor which the gas compressed by the compressor is fed to, and a turbine to be driven by the combustion gas of the combustor.

Further, primarily, its feature is that the gas turbine unit of the present invention has a turbine-cooling system to feed the gas from the compressor to the turbine. The turbine-cooling system comprises a heat exchanger to cool the gas compressed by the compressor and a means for separating liquid from the gas cooled by the heat exchanger.

The gas-turbine cooling method of the present invention for cooling a gas-turbine unit, which comprises a compressor to compress and discharge gas, a combustor which the gas compressed by the compressor is fed to, and a turbine to be driven by the combustion gas of the combustor, includes the process of feeding the gas from compressor to the turbine to cool it. The turbine-cooling process comprises the steps of cooling the gas compressed by the compressor and separating liquid from the cooled gas.

BEST MODE FOR CARRYING OUT THE INVENTION

First Embodiment

Figure 1:
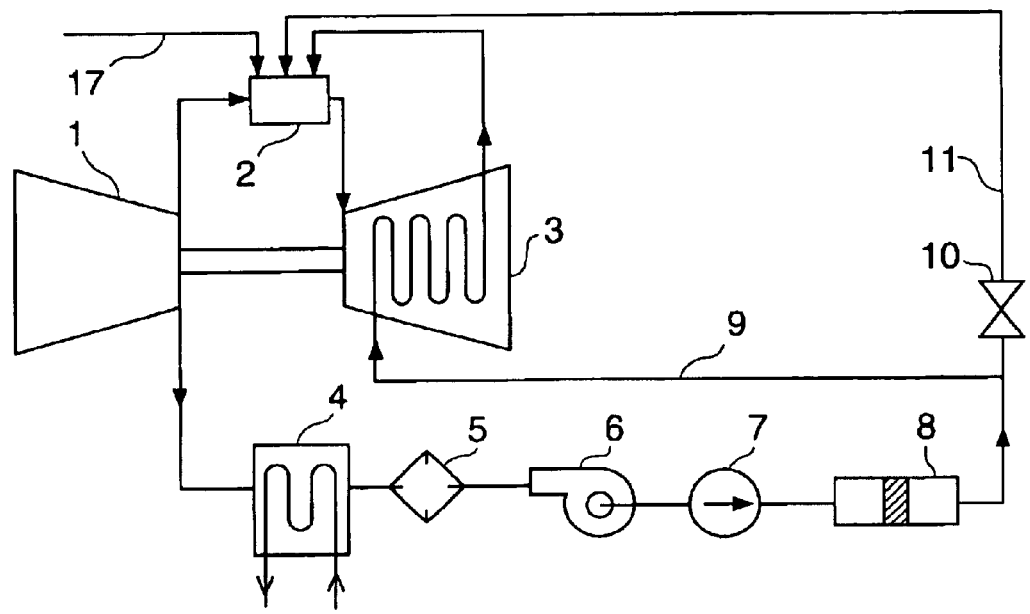
FIG. 1 is a system diagram of a cooling system of the high-temperature part of a gas turbine in accordance with the present invention.

With reference to FIG. 1, the first embodiment of the present invention will now be described in detail. FIG. 1 shows a cooling system of the high-temperature part of a gas turbine. The gas turbine unit of FIG. 1 comprises mainly a compressor 1 to compress and discharge gas, a combustor 2 which the gas compressed by the compressor 1 is fed to, and a turbine 3 to be driven by the combustion gas of the combustor 2.

Arranged from upstream to downstream in the cooling system of this embodiment are a heat exchanger 4 for cooling the gas compressed by the compressor 1, a means for separating liquid from gas, a dust-collecting means for separating dust, etc. from gas, a booster compressor 7, and, again, a dust-collecting means for separating dust, etc. from gas.

Next, the cooling system of the high-temperature part of the gas turbine will be described concretely along the flow of cooling air.

The compressed air for cooling tapped from the compressor 1 through a branch line is fed to the heat exchanger 4. The compressed air fed to the heat exchanger 4 is cooled down to about 130° C. In this embodiment, the compressed air is indirectly cooled by a refrigerant. The cooled compressed air is fed from the heat exchanger 4 to a means for separating liquid from gas.

In this embodiment, a mist separator 5, which is a kind of gas-liquid separator, is adopted as the means for separating liquid from the gas fed from the heat exchanger 4. The mist separator 5 separates mist from the compressed air introduced in it. Namely, the mist due to the cooling of compressed air by the heat exchanger 4 is separated from the compressed air by the mist separator 5. By having compressed air pass through the mist separator 5, mist in the compressed air can be removed. Accordingly, erosion and dust-adhesion inside the booster compressor 7 and the cooling-air ducts of the high-temperature part of the turbine 3 disposed downstream can be prevented. Namely, because the gas-liquid separator is disposed below the heat exchanger 4 in the cooling system, mist generated in the cooling step of the heat exchanger 4 can be removed. Because the gas-liquid separator is disposed below the heat exchanger 4 and above the booster compressor 7 in the cooling system, mist generated in the cooling step of the heat exchanger 4 can be removed and erosion and dust-adhesion inside the booster compressor 7 and the cooling-air ducts of the high-temperature part of the turbine 3 can be prevented.

Thereafter, the compressed air is fed from the mist separator 5 to the dust-collecting means for separating dust, etc. from gas. In this embodiment, a cyclone 6 is adopted as the dust-collecting means for separating dust, etc. from gas. In the cyclone 6, alien substances such as dust contained in the cooled compressed air can be removed. By purifying the cooled compressed air in the cyclone 6, the booster compressor 7 disposed below the cyclone 6 can be prevented from being damaged by dust, etc. Besides, unlike a filter with metal meshes, the cyclone 6, which is a centrifugal dust-collecting means, has hardly increasing pressure loss during its continuous operation and hence is capable of operating continuously over a long period of time. Namely, it is free from such clogging of meshes and increasing pressure loss as occur in a filter with meshes.

Namely, because the dust-collecting means for separating dust, etc. from gas is disposed below the heat exchanger 4 and the mist separator 5, dust, etc. in the air fed through the heat exchanger 4 and the mist separator 5 can be removed. In addition, because the dust-collecting means for separating dust, etc. from gas is disposed below the heat exchanger 4 and the mist separator 5 and above the booster compressor 7, dust, etc. in the air fed through the heat exchanger 4 and the mist separator 5 can be removed and hence the booster compressor 7 can be prevented from being damaged by dust, etc. On the other hand, by adopting a cyclone 6 as the dust-collecting means for separating dust, etc. from gas at this place, (i) the pressure loss hardly increases during the continuous operation, (ii) long-time continuous operation becomes possible, and (iii) such increase in pressure loss due to the clogging of meshes as occurs in a filter with meshes is rendered irrelevant.

Then, the compressed air is fed from the cyclone 6 to the booster compressor 7. The booster compressor 7 raises the pressure of the compressed air to a desired level. At the time, the pressure is raised to about 50 kg/cm² optimal for cooling the turbine 3. In this way, the pressure of the compressed air can be raised by the booster compressor 7 to the level appropriate for cooling the turbine 3.

The booster compressor 7 is driven by the turbine shaft because cooling air always has to be fed to the turbine 3 while it is operating. However, the arrangement of equipment or limited available space may not allow such driving system to be adopted. In this case, the booster compressor 7 is driven by an electric motor. However, if the electric motor gets out of order, the supply of cooling air to the turbine 3 goes down. Therefore, it is desirable to provide the gas turbine unit with a protection device which stops the gas turbine immediately when the electric motor of the booster compressor 7 gets out of order. By providing the gas turbine unit with a protection device having a means for detecting the trouble of the electric motor and a means for stopping the gas turbine based on a signal from the trouble-detecting means, the gas turbine can be stopped to prevent it from being damaged in the event that cooling air is not sufficiently supplied to the high-temperature part of the gas turbine.

A dust-collecting means for separating dust, etc. from gas is disposed below the booster compressor 7. In this embodiment, a filter 8 is adopted as the dust-collecting means. The compressed air for cooling is fed from the booster compressor 7 to the filter 8.

While the gas turbine is starting or stopping, the flow rate of the cooling air fed from the compressor 1 is low. Accordingly, the flow velocity at the inlet of the cyclone 6 is low, and hence the cyclone 6 may not be able to exert its dust-collecting capability well due to its working principle, purifying the cooling air insufficiently. On the other hand, the dust-collecting capability of the filter 8 which uses metal meshes or the like is not affected by the low flow velocity of the cooling air. Thus, when the flow velocity of the cooling air is low while the gas turbine is starting or stopping, the cooling air can be purified by the filter 8. Namely, by disposing, below the booster compressor 7, the filter 8 which is a means for separating dust, etc. from the cooling air by receiving the air with fiber or the like, the cooling air can be purified even while the gas turbine is starting or stopping and hence the flow velocity of the cooling air is low.

Besides, while the turbine 3 is operating at its rated speed, the pressure-raised compressed air (cooling air) is finally purified with excellent accuracy before the air is fed to the turbine 3. By purifying the air again, alien substances such as rust produced in the booster compressor 7 can be removed. Namely, because the dust-collecting means for separating dust. etc. from gas is disposed, in the cooling system, between the booster compressor 7 and the turbine 3, alien substances such as rust produced in the booster compressor 7 can be removed while the gas turbine is operating at its rated speed.

Then, the cooling air is fed from the filter 8 to the turbine 3. In the turbine 3, the cooling air cools such high-temperature part of the turbine 3 as the gas-turbine blades and the rotor. Thereafter, the cooling air is fed to the combustor 2, and the heat gained by cooling the turbine 3 is recovered from the air. Thus, the cooling system is of a closed type.

With the above cooling system, the generation efficiency of gas-turbine power-generating equipment can be raised.

As FIG. 1 shows, in this cooling system, a bypass line 11 with a bypass valve 10 is laid around the turbine 3 below the filter 8 so that the cooling air can be collected to the combustor 2 not through the line 9 leading to the turbine 3, but through the bypass line 11.

While the gas turbine is starting, stopping, or operating under a partial load, transient surges occur in the booster compressor 7. Before the turbine unit gets into such condition, the bypass valve 10 is opened to let part of the cooling air through the bypass line 11 and thereby to control the air flow through the line 9 and avoid such surging. Namely, by laying the bypass line 11, transient surging in the booster compressor 7 can be checked.

On the other hand, while the gas turbine is starting, stopping, or operating under a partial load, the temperature of the combustion gas driving the turbine 3 is lower than that of the combustion gas during the operation at the rated speed. Therefore, the high-temperature part of the turbine 3 may be overcooled if all the cooling air is fed to the turbine 3. If the high-temperature part of the turbine 3 is cooled beyond the necessary degree, the temperature difference between the surfaces of the high-temperature part and the cooling holes may give rise to thermal stress, which may cause damage to the turbine 3. Therefore, excess cooling air is collected to the combustor 2 through the bypass line 11. Thus, excessive cooling air can be prevented from flowing into the turbine 3 because the bypass line 11 and the bypass valve 10 are provided. Namely, by controlling the bypass valve 10, the cooling air can be fed to the turbine 3 at an appropriate flow rate.

As described above, disposed in the bypass line 11 is the bypass valve 10 that is a flow-rate control valve to control the flow rate of the cooling air going around the turbine 3. By controlling the bypass valve 10, the necessary flow rate of cooling air to the turbine 3 can be secured and excess cooling air can be collected through the bypass line 11 to the combustor 2.

Besides, the bypass line 11 may be laid not to the combustor 2, but to an upstream point above the heat exchanger 4 to achieve the same effect.

Moreover, a more efficient cooling system for the high-temperature part of the turbine 3 can be constructed by monitoring metal temperatures of the high-temperature part of the turbine 3 or the temperature of the collected cooling air, and thereby determining whether the high-temperature part of the turbine 3 is properly cooled or not and controlling the bypass valve 10 accordingly. Namely, the cooling condition of the high-temperature part of the turbine 3 can be monitored by providing a means for detecting metal temperatures of the high-temperature part of the turbine 3 or the temperature of the collected cooling air. Besides, more appropriate cooling can be made and a more efficient cooling system for the high-temperature part of the turbine 3 can be constructed by providing a means for adjusting the bypass valve 10 based on metal temperatures of the high-temperature part of the turbine 3 or the temperature of the collected cooling air when the high-temperature part of the turbine 3 is not properly cooled.

It is preferable to close the bypass valve 10 completely from the point of view of the operating efficiency of the plant. However, the cooling condition of the high-temperature part of the turbine 3 may vary depending on weather conditions such as atmospheric temperature. Therefore, it is desirable to control the bypass valve 10 according to circumstances so as to optimize the cooling condition of the high-temperature part of the turbine 3.

Besides, in case of a gas turbine unit in which the cooling air after cooling the high-temperature part of the gas turbine is not collected into the combustor, but exhausted together with the combustion gas after driving the gas turbine, this cooling system can feed cooling air which flows smoothly through the high-temperature part of the gas turbine without causing the clogging of cooling holes with dust, etc. and thereby improves the reliability of the whole plant.

Further, in case of a closed-type cooling system, salient effect is achieved by purifying the cooling air.

Second Embodiment

Figure 2:
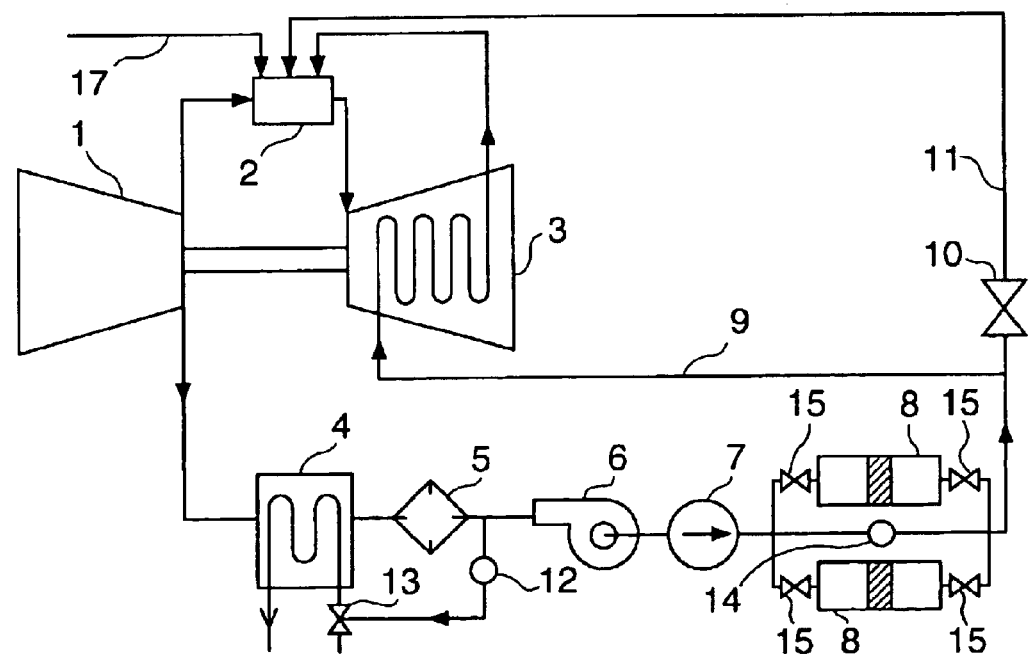
FIG. 2 is a system diagram of a cooling system of the high-temperature part of a gas turbine in accordance with the present invention.

With reference to FIG. 2, the second embodiment of the present invention will now be described in detail. FIG. 2 shows a cooling system of the high-temperature part of a gas turbine.

The gas turbine unit of FIG. 2 comprises mainly a compressor 1 to compress and discharge gas, a combustor 2 which the gas compressed by the compressor 1 is fed to, and a turbine 3 to be driven by the combustion gas of the combustor 2.

Arranged from upstream to downstream in the cooling system of this embodiment are a heat exchanger 4 for cooling the gas compressed by the compressor 1, a means for separating liquid from gas, a dust-collecting means for separating dust, etc. from gas, a booster compressor 7, and, again, a dust-collecting means for separating dust, etc. from gas.

In this embodiment, in the cooling system, disposed in the vicinity of the outlet of a heat exchanger 4 as shown in FIG. 2 is a thermometer 12 which is a means for detecting the temperature of the cooling air (compressed air) from the heat exchanger 4. Because the means for detecting the temperature of the cooling air (compressed air) is provided, it can be monitored whether the cooling air is properly cooled or not.

Also provided in this embodiment is a flow control valve 13 which is a means for controlling the flow rate of refrigerant to the heat exchanger 4 in accordance with the temperature measured by the thermometer 12. With the flow control valve 13, the flow rate of refrigerant to the heat exchanger 4 can be controlled in accordance with the temperature measured by the thermometer 12. This control of refrigerant enables the management and the control of the temperature of cooling air.

Moreover, provided in this embodiment is a differential pressure gauge 14 which is a means for measuring the difference between the pressures before and after the filter 8. The differential pressure gauge 14 enables to monitor the difference between the pressures before and after the filter 8 and the clogging of meshes of the filter 8. If the difference between the pressures before and after the filter 8 becomes large, the cooling air cannot be fed at a sufficient flow rate to the high-temperature part of the turbine 3. Therefore, it is desirable to provide the gas turbine unit with a protection device which stops the gas turbine immediately after such an event occurs.

Namely, damage to the gas turbine can be prevented by stopping the gas turbine on the basis of the measured value of the differential pressure gauge 14.

Also preferable for higher reliability is the configuration that at, least two filters 8 are disposed in the cooling system in parallel and a selector valve 15 is disposed before and after each filter 8 so as to make switchover between the filters 8 and keep the difference between the pressures before and after the filter 8 in service in a permissible range.

Third Embodiment

Figure 3:
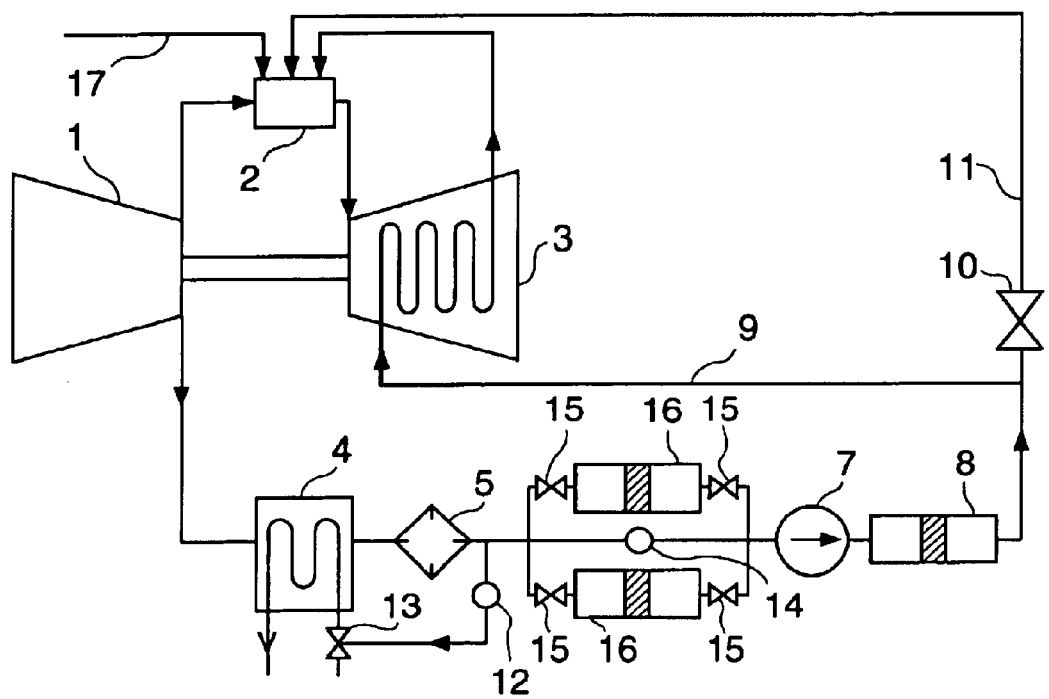
FIG. 3 is a system diagram of a cooling system of the high-temperature part of a gas turbine in accordance with the present invention.

With reference to FIG. 3, the third embodiment of the present invention will now be described in detail. FIG. 3 shows a cooling system of the high-temperature part of a gas turbine.

The gas turbine unit of FIG. 3 comprises mainly a compressor 1 to compress and discharge gas, a combustor 2 which the gas compressed by the compressor 1 is fed to, and a turbine 3 to be driven by the combustion gas of the combustor 2.

Arranged from upstream to downstream in the cooling system of this embodiment are a heat exchanger 4 for cooling the gas compressed by the compressor 1, a means for separating liquid from gas, a dust-collecting means for separating dust, etc. from gas, a booster compressor 7, and, again, a dust-collecting means for separating dust, etc. from gas.

Particularly, in this embodiment, a plurality (at least two) of filters 16 is disposed in parallel below the mist separator 5 in the cooling system and a differential pressure gauge 14 is provided to measure the difference between the pressures before and after the filter 16 in service, as shown in FIG. 3. This configuration enables to monitor the pressure loss of the filter 16 in service, make switchover among the filters 16, and change metal meshes of the filters 16 out of service.

Thus, continuous dust-collecting effect can be achieved, trouble due to the clogging of filter meshes can be prevented, the maintenance of filter meshes can be carried out easily, and an appropriate cooling system can be constructed.

Namely, the filters 16, as described in the present embodiments, can remove alien substances such as dust contained in the cooled compressed air. By purifying the cooled compressed air in the filters 16, the booster compressor 7 disposed downstream can be prevented from being damaged by such alien substances. Besides, the plurality of filters 16 is disposed in parallel, and the means for measuring the differential pressure of the filters 16 and the means for making switchover among the filters 16 are provided. Therefore, even if the filter 16 in service gets clogged with dust, etc. after a long service time, switchover among the filters 16 can be made and the pressure loss of the filter 16 in service can be prevented from increasing excessively.

Namely, because the dust-collecting means for separating dust, etc. from gas is disposed below the heat exchanger 4 and the mist separator 5, dust, etc. can be removed from the air fed through the heat exchanger 4 and the mist separator 5. Besides, because the dust-collecting means for separating dust, etc. from gas is disposed below the heat exchanger 4 and the mist separator 5 and above the booster compressor 7, dust, etc. in the air fed through the heat exchanger 4 and the mist separator 5 can be removed and hence the booster compressor 7 can be prevented from being damaged by dust, etc. Moreover, the plurality of filters 16 is disposed, as the means for separating dust, etc. from gas, in parallel between the mist separator 5 and the booster compressor 7, and the means for measuring the differential pressure of the filters 16 and the means for making switchover among the filters 16 are provided. Therefore, the decrease of flow rate of the cooling air due to the increase of pressure loss in the filters 16 during the continuous operation of the gas turbine unit can be prevented, and the gas turbine unit can be operated continuously over a long time period.

Fourth Embodiment

Figure 4:
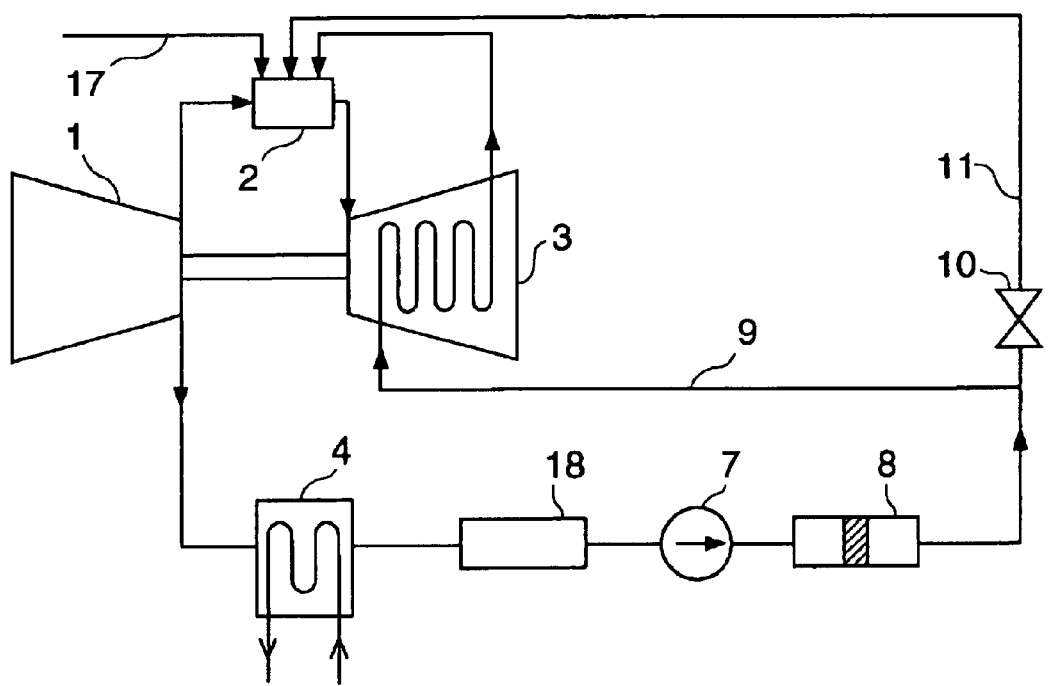
FIG. 4 is a system diagram of a cooling system of the high-temperature part of a gas turbine in accordance with the present invention.

With reference to FIG. 4, the fourth embodiment of the present invention will now be described in detail. FIG. 4 shows a cooling system of the high-temperature part of a gas turbine.

The gas turbine unit of FIG. 4 comprises mainly a compressor 1 to compress and discharge gas, a combustor 2 which the gas compressed by the compressor 1 is fed to, and a turbine 3 to be driven by the combustion gas of the combustor 2.

Arranged from upstream to downstream in the cooling system of this embodiment are a heat exchanger 4 for cooling the gas compressed by the compressor 1, a means for separating liquid from gas and also separating dust, etc. from the same, a booster compressor 7, and a dust-collecting means for separating dust, etc. from gas.

In this embodiment, a gas-liquid-separating/dust-collecting device 18 is provided as the means for separating liquid and dust, etc. from gas. A filter 8 is disposed, below the booster compressor 7, as the dust-collecting means for separating dust, etc. from gas. The gas-liquid-separating/dust-collecting device 18 in the present embodiment serves as the means for separating liquid from gas (for example, a mist separator 5) of the first embodiment and, at the same time, as the dust-collecting means for separating dust, etc. from gas (for example, a cyclone 6) of the first embodiment. In addition to the double functionality, it contributes to the simplification of the gas turbine unit.

Moreover, the filter 8 may be omitted in this embodiment to simplify the unit because the filtering accuracy is relatively stable even while the gas turbine is starting or stopping.

Fifth Embodiment

Figure 5:
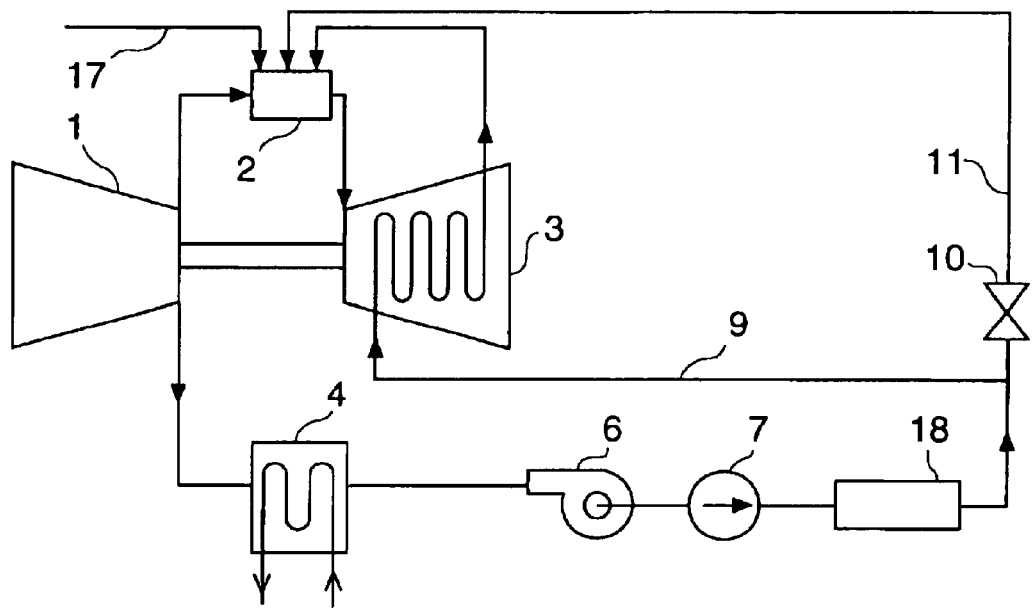
FIG. 5 is a system diagram of a cooling system of the high-temperature part of a gas turbine in accordance with the present invention.
Figure 6:
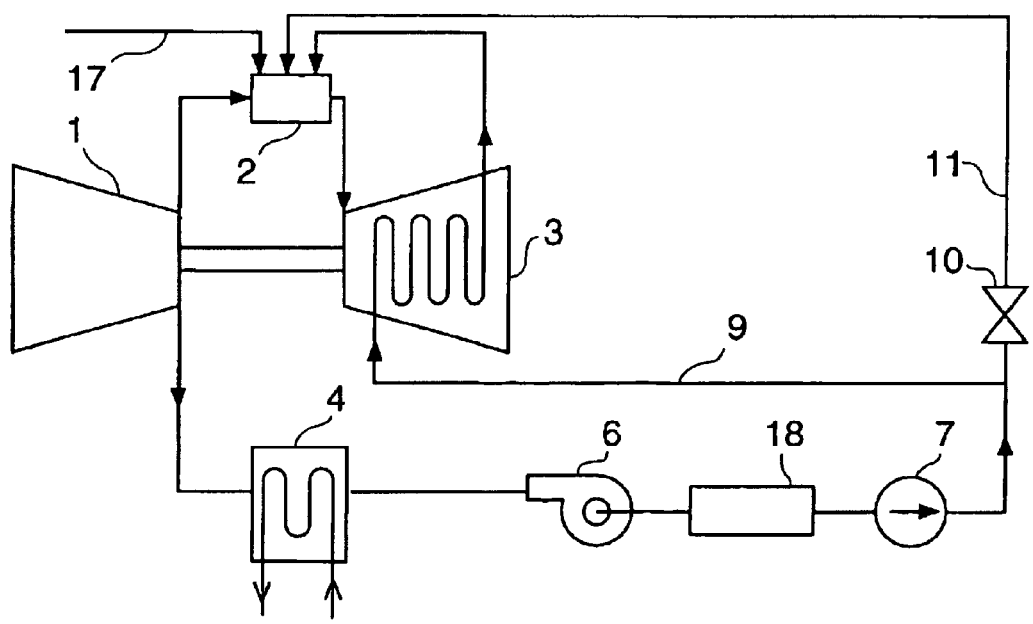
FIG. 6 is a system diagram of a cooling system of the high-temperature part of a gas turbine in accordance with the present invention.

With reference to FIGS. 5 and 6, the fifth embodiment of the present invention will now be described in detail. FIGS. 5 and 6 show a cooling system of the high-temperature part of a gas turbine.

The gas turbine unit of FIGS. 5 and 6 comprises mainly a compressor 1 to compress and discharge gas, a combustor 2 which the gas compressed by the compressor 1 is fed to, and a turbine 3 to be driven by the combustion gas of the combustor 2.

Arranged from upstream to downstream in the cooling system of this embodiment are a heat exchanger 4 for cooling the gas compressed by: the compressor 1, a dust-collecting means for separating dust, etc. from gas (for example, a cyclone 6), and a booster compressor 7.

In the example of FIG. 5, a gas-liquid-separating/dust-collecting device 18, which is a means for separating liquid and dust, etc. from gas, is disposed below the booster compressor 7.

Because the gas-liquid-separating/dust-collecting device 18 is disposed below the heat exchanger 4, the cyclone 6, and the booster compressor 7 and above the turbine 3, mist to be generated in the compressed air due to the cooling by the heat exchanger 4 can be removed and erosion and dust-adhesion inside the cooling-air ducts of the high-temperature part of the turbine 3 can be prevented. In addition, by adopting the double-functional gas-liquid-separating/dust-collecting device 18, the gas turbine unit can be simplified.

Further, because the gas-liquid-separating/dust-collecting device 18 is disposed immediately before the turbine 3 in this embodiment, highly reliable and highly purified air can be fed to the turbine 3.

In the example of FIG. 6. a gas-liquid-separating/dust-collecting device 18, which is a means for separating liquid and dust, etc. from gas, is disposed between the cyclone 6 and the booster compressor 7.

Because the gas-liquid-separating/dust-collecting device 18 is disposed below the heat exchanger 4 and the cyclone 6 and above the booster compressor 7, mist to be generated in the compressed air due to the cooling by the heat exchanger 4 can be removed and erosion and dust-adhesion inside the booster compressor 7 and the cooling-air ducts of the high-temperature part of the turbine 3 can be prevented. In addition, by adopting the double-functional gas-liquid-separating/dust-collecting device 18, the gas turbine unit can be simplified.

Industrial Applicability

According to the present invention, there is provided a gas turbine unit and a gas-turbine cooling method capable of feeding cooling air suitable for cooling the high-temperature part of the gas turbine.

What is claimed is:

1. A gas turbine unit comprising a first compressor to compress and discharge gas, a combustor to which gas compressed by the first compressor is fed, and a turbine to be driven by combustion gas from the combustor;

wherein said gas turbine unit has a turbine-cooling system to feed gas from said first compressor to the turbine, said turbine-cooling system comprising: a heat exchanger to cool the gas compressed by said first compressor, a liquid-separating means for separating liquid from the gas cooled by the heat exchanger, a dust-collecting means for separating dust from the gas having passed through the liquid-separating means, and a second compressor to raise the pressure of the gas having passed through the dust-collecting means to a desired level.

2. A gas turbine unit comprising a first compressor to compress and discharge gas, a combustor to which gas compressed by the first compressor is fed, and a turbine to be driven by combustion gas from the combustor;

wherein said gas turbine unit has a turbine-cooling system to feed gas from said first compressor to the turbine, said turbine-cooling system comprising: a heat exchanger to cool the gas compressed by said first compressor, a liquid-separating means for separating liquid from the gas cooled by said heat exchanger, a second compressor to raise the pressure of the gas having passed through said liquid-separating means to a desired level, and a dust-collecting means for separating dust from gas disposed below said second compressor.

3. A gas turbine unit comprising a first compressor to compress and discharge gas, a combustor to which gas compressed by the first compressor is fed, and a turbine to be driven by combustion gas from the combustor;

wherein said gas turbine unit has a turbine-cooling system to feed gas from said first compressor to the turbine, said turbine-cooling system comprising: a heat exchanger to cool the gas compressed by said first compressor, a liquid-separating means for separating liquid from the gas cooled by the heat exchanger, a first dust-collecting means for separating dust from the gas having passed through the liquid-separating means, a second compressor for raising the pressure of the gas having passed through the first dust-collecting means to a desired level, and a second dust-collecting means for separating dust from the gas whose pressure has been raised by the second compressor.

4. A gas turbine unit comprising a first compressor to compress and discharge gas, a combustor to which gas compressed by the first compressor is fed, and a turbine to be driven by the combustion gas from the combustor;

wherein said gas turbine unit has a turbine-cooling system to feed gas from said first compressor to the turbine to cool the turbine and to feed gas from the turbine to the combustor, said turbine-cooling system comprising an indirect cooling heat exchanger to cool the gas compressed by said first compressor, a mist separator for separating liquid from the gas cooled by the heat exchanger, a cyclone for separating dust from the gas having passed through the mist separator, a second compressor to raise the pressure of the gas having passed through the cyclone to a desired level and a filter for separating dust from the gas whose pressure has been raised by the second compressor.

5. A gas turbine unit comprising a first compressor to compress and discharge gas, a combustor to which the gas compressed by the first compressor is fed, and a turbine to be driven by combustion gas from the combustor;

wherein said gas turbine unit has a turbine-cooling system to feed gas from said first compressor to the turbine, said turbine-cooling system comprising a heat exchanger to cool the gas compressed by said first compressor, a separating means for separating liquid and dust from the gas cooled by the heat exchanger, a second compressor to raise the pressure of the gas having passed through said separating means to a desired level, and a dust-collecting means for separating dust from the gas whose pressure has been raised by the second compressor.

6. A gas-turbine cooling method for a gas turbine unit comprising a compressor to compress and discharge gas, a combustor to which gas compressed by the compressor is fed, and a turbine to be driven by combustion gas from the combustor;

wherein the gas compressed by said compressor is cooled, liquid is separated from the gas cooled, dust is separated from the separated gas, the pressure of the separated gas is raised to a desired level, and after dust is separated from the gas whose pressure has been raised, the gas is fed to the turbine so that the turbine may be cooled.

* * * * *